United States Patent [19]

Lang et al.

[11] 4,092,656
[45] May 30, 1978

[54] PHOTOGRAPHIC CAMERA WITH INTERCHANGEABLE LENS

[75] Inventors: Rudolf Lang, Grafing Bahnhof; Gerhard Schwarz, Munich, both of Germany

[73] Assignee: Carl Zeiss Stiftung, Oberkochen, Germany

[21] Appl. No.: 742,020

[22] Filed: Nov. 15, 1976

[30] Foreign Application Priority Data

Nov. 17, 1975 Germany ............................ 2551544

[51] Int. Cl.² ........................ G03B 17/00; G03B 17/38
[52] U.S. Cl. ..................... 354/202; 354/268; 354/286
[58] Field of Search ............... 354/202, 268, 286, 289, 354/46, 127

[56] References Cited
U.S. PATENT DOCUMENTS

| | | | |
|---|---|---|---|
| 3,762,295 | 10/1973 | Kitai | 354/286 X |
| 3,823,411 | 7/1974 | Hasegawa et al. | 354/286 X |

*Primary Examiner*—John Gonzales
*Attorney, Agent, or Firm*—Stonebraker, Shepard & Stephens

[57] ABSTRACT

A photographic camera with an interchangeable lens and an electrically driven function actuator for actuating some function of the camera such as the operation of the shutter. The circuit of the function actuator includes a switch responsive to the position of the interchangeable lens, so that the function actuator cannot be operated unless the interchangeable lens is fully seated or engaged in proper operating position.

4 Claims, 4 Drawing Figures

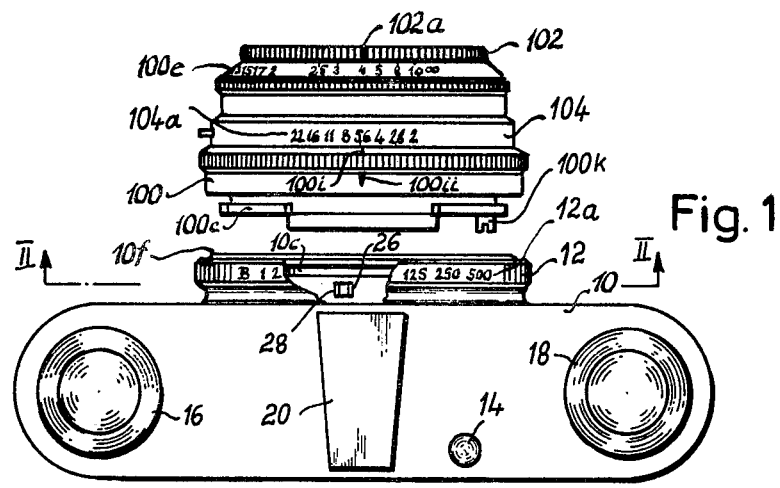
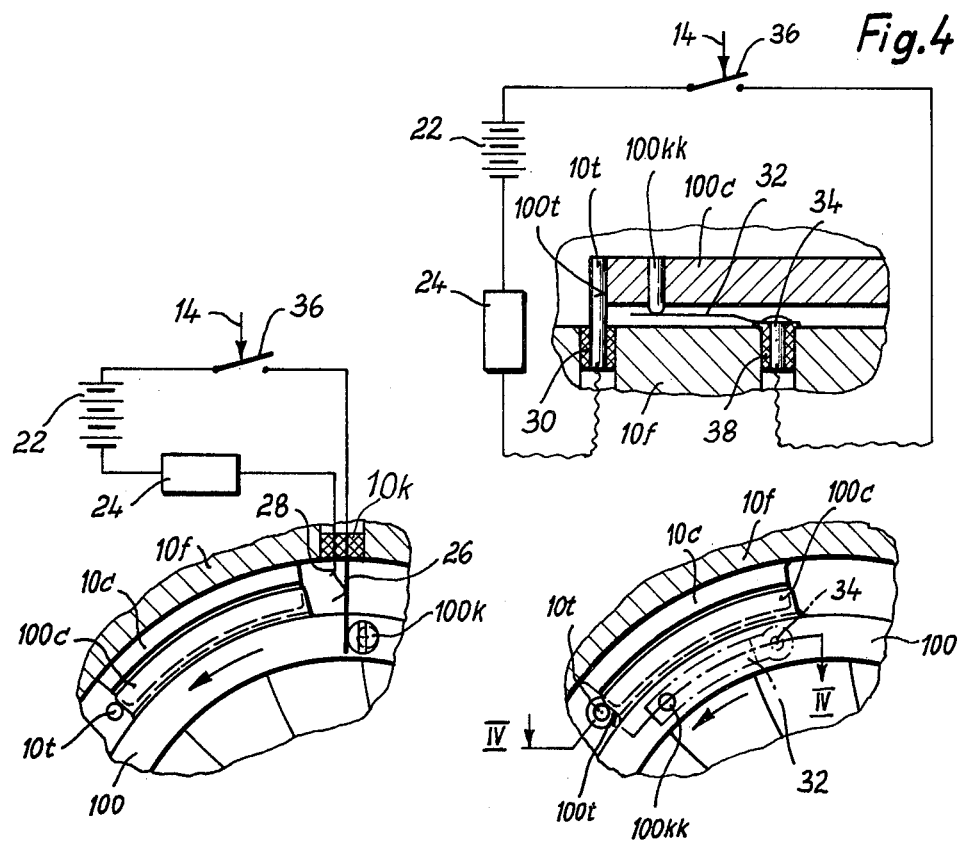

PHOTOGRAPHIC CAMERA WITH INTERCHANGEABLE LENS

BACKGROUND OF THE INVENTION

The invention relates to a photographic camera with an interchangeable lens, the camera having some function of the camera (such for example as the actuation of the shutter) operated or controlled electrically by what may be called a function actuator.

When one lens is removed from the camera body and replaced by another lens, it sometimes happens that the user of the camera, through haste or inattention, may not engage the new lens completely with the camera body in the fully mounted or engaged position which it should occupy. Operation of the camera when the lens is not in proper mounted position may lead to faulty results.

The object of the present invention is to provide means of a simple and relatively inexpensive form providing assurance that the electrical system of the camera cannot be operated until the replacement lens is fully mounted or properly seated on the camera body. According to one embodiment of the invention, this is achieved by providing, in the circuit of the electrical actuator, an interrupter contact or switch which is closed automatically when the replaceable lens is fully or properly seated on the camera, and which is open or non-conductive at other times, preventing the camera function (such as operation of the shutter) from being caused accidentally when the lens has not been fully and properly attached. In this way, erroneous manipulations are prevented, and the damage which could result from using the camera when the lens is not properly positioned, is reliably avoided.

BRIEF DESCRIPTION OF THE DRAWINGS

FIG. 1 is a top plan view of a camera in accordance with a preferred embodiment of the invention, showing the interchangeable lens slightly separated from the camera body;

FIG. 2 is a fragmentary transverse section taken approximately on the line II—II of FIG. 1, with the addition of a schematic wiring diagram;

FIG. 3 is a view similar to FIG. 2, illustrating a modification; and

FIG. 4 is a fragmentary section through the parts shown in FIG. 3, taken approximately on the line IV—IV of FIG. 3, and with the addition of a wiring diagram.

DESCRIPTION OF THE PREFERRED EMBODIMENTS

Except for the parts specifically referred to herein, the camera may be of conventional construction well known in the art. It includes, for example, a main camera body or housing 10 having a built-in shutter of a conventional kind, not shown. The shutter speed or exposure time is set by turning a shutter speed ring 12 concentric with the optical axis and rotatable on the front tube 10f of the camera 10. The camera has a release member or trigger member 14, a film transport or winding knob 16, a rewinding knob 18, and a direct viewfinder 20. All of these parts are well known in the art and need not be described in further detail.

Within the camera tube 10f there are provided several bayonet slots 10c of conventional kind, which receive the conventional bayonet lugs or flanges 100c on the interchangeable lens mount indicated in general at 100.

The lens is attached to the camera in the familiar manner, by moving it axially toward the camera body with the optical axis of the interchangeable lens aligned accurately with the optical axis of the camera body, and then twisting the interchangeable lens about the optical axis as a center of rotation, to bring the bayonet lugs 100c on the lens into wedging engagement with the slots 10c on the camera body. The lens is removed from the camera by a reversal of these operations.

Conventional lens components are within the lens mount 100 and are displaced axially for focusing by turning a conventional focusing ring 102 at the front of the mount, the index mark 102a thereon being read in conjunction with a focus distance scale 100e marked on a stationary portion of the mount. A diaphragm device of known type, (for example, a conventional iris diaphragm) is included within the lens mount structure and is adjusted to various apertures or f-values by turning a diaphragm setting ring 104 bearing an aperture scale 104a read in conjunction with an index mark 100i on a fixed part of the lens mounts. A second index mark 100ii on the same fixed part of the mount cooperates with the shutter speed scale or exposure time scale 12a marked on the circumference of the shutter speed setting ring 12.

The camera body includes an electric circuit having a source of current such as the battery 22, and a device indicated by the rectangular block 24 which schematically represents what may be called a "function actuator," intended to operate any desired function of the camera, such for example as the releasing and/or driving and/or control of the shutter. The shutter and the actuator may be developed, for example, in the manner disclosed in German Pat. No. 1,280,440, published Nov. 7, 1968, and in the corresponding U.S. Pat. No. 3,547,021 of Wilhelm Pross, granted Dec. 15, 1970.

The electric circuit of the camera includes not only the above mentioned battery 22 and actuator 24, but also a switch 26, 28 which is responsive to the position of the interchangeable lens mounted on the camera body. The switch comprises two contact springs, the first spring 26 being longer than the second spring 28, both being mounted in an insulating block 10k set in the camera tube 10f as illustrated. The springs are normally slightly separated from each other, to constitute a normally open switch.

When the interchangeable lens is applied to the camera body and twisted in the direction of the arrow (FIG. 2) to its home or fully seated position, a contact actuator 100k mounted on the interchangeable lens mount engages the long switch arm 26 and displaces it to make conductive contact with the other switch member 28, just as the twisting motion of the lens mount reaches its final or limit position, which position is determined by engagement of one end of one of the bayonet wings or lugs 100c with a stop pin 10t on the camera body. In order to enable the fine adjustment, the contact actuator 100k is developed as a plastic insulating pin whose head is eccentric with respect to a shank portion snugly but rotatably mounted in a bore in the lens mount. The head is provided with a screwdriver slot so that the head and its shank may be slightly turned for close adjustment of the exact point at which the resilient switch arm 26 will be displaced far enough to make contact with the other switch arm 28.

The circuit includes the battery 22, actuator 24, and switch 26, 28 in series with each other and with another switch 36 which is actuated by the camera operator at an appropriate time, when a particular camera function is to be performed. For example, the switch 36 may be actuated by depressing the release plunger 14, whereupon the circuit will be completed through the switch 36 (assuming that the switch 26, 28 is already closed by proper positioning of the interchangeable lens mount) and current will be supplied to the function actuator 24, to perform whatever function is to be performed thereby, such as operating an electrically controlled shutter. Whenever the interchangeable lens is not properly and completely seated on the camera body, however, the switch 26, 28 will be open rather than closed, and then even if the switch 36 is closed, the function actuator 24 will not be operated and a malfunction of the camera will not occur. Thus the incomplete seating of the interchangeable lens on the camera (or the complete absence of an interchangeable lens) will immediately be brought to the attention of the operator when he operates the member 14 to close the switch 36, and finds that the camera will not operate.

When the lens mount is fully seated, it is normally held in fully seated position by a conventional latch (not shown) which must be manually released in order to remove the lens. Upon release of this latch and twisting of the lens in the direction opposite to the arrow, the switch 26, 28 immediately opens as soon as the removal twisting motion begins.

FIGS. 3 and 4 illustrate a modification of the invention. The stop pin 10t which limits the on-twisting motion of the lens mount is in this embodiment developed as a current conductive member mounted in an insulating bushing 30 in the flange 10f of the camera body. A contact tongue 32 is also mounted on the camera tube 10f by means of a conductive pin 34 in an insulating bushing 38. A conductive pin 100kk on the metal flange 100c of the lens mount slides along the conductive tongue 32 during the twisting motion of the lens mount.

When the lens has been twisted fully to its home position the end surface 100t of the bayonet flange 100c comes into electrical conductive contact with the pin 10t on the camera body, thus completing the circuit in the manner shown in FIG. 4. In other words, the circuit is completed from the battery 22 through the function actuator 24 to the pin 10t, thence to the surface 100t of the flange 100c, thence to the pin 100kk on this flange, to the tongue 32, pin 34, and through the switch 36 (when it is closed) to the other side of the battery 22.

Just as in the case of the first embodiment, the circuit can be completed and the actuator 24 can be actuated only when the interchangeable lens is fully twisted to its completely seated or home position. In any other position, the end 100t of the flange 100c does not make contact with the pin 10t and the circuit is broken at this point.

In conclusion, it may be mentioned that an interrupter contact of the type described or of any different type may also be used in other cases in which an electric or electronic device on the camera side of the interface between the camera body and the lens is to be released for operation only when the interchangeable lens assumes its full or proper seat in the camera.

We claim:

1. A photographic camera having a camera body and an interchangeable lens movable relative to said body between a first position fully seated on and engaged with said body and a second position not fully seated on said body, said camera comprising an electrically operated function actuator, an electric circuit for operating said actuator, and interrupter switch means responsive to the position of said interchangeable lens for disabling said electric circuit to prevent actuation of said function actuator when there is no interchangeable lens fully seated on said body in said first position, said interrupter switch means comprising a switch in said circuit, said switch being closed only with said interchangeable lens is fully seated in its said first position and being open at all other times, wherein said switch includes two resilient conductors mounted on said camera body and tending to remain out of contact with each other, and an actuator mounted on said interchangeable lens for engaging one of said resilient conductors and moving it into contact with the other of said conductors as said interchangeable lens moves to its fully seated position.

2. A camera as defined in claim 1, wherein said actuator comprises an eccentric pin of insulating material.

3. A photographic camera having a camera body and an interchangeable lens movable relative to said body between a first position fully seated on and engaged with said body and a second position not fully seated on said body, said camera comprising an electrically operated function actuator, an electric circuit for operating said actuator, and interrupter switch means responsive to the position of said interchangeable lens for disabling said electric circuit to prevent actuation of said function actuator when there is no interchangeable lens fully seated on said body in said first position, wherein said interchangeable lens includes a metallic projection and said camera body includes a stop member engaging said metallic projection when said interchangeable lens is fully seated in its said first position, characterized by the fact that said stop member is a current conductive part of said circuit and forms a first contact member of said interrupter switch means, and said metallic projection is also a current conductive part of said circuit and forms a second contact member of said interrupter switch means, so that when said projection on said lens comes into engagement with said stop member in the fully seated position of the lens, the two contact members come into current conducting contact.

4. A camera as defined in claim 3, wherein said circuit comprises a conductive contact tongue mounted on and insulated from said camera body, and a conductive contact pin mounted on said metallic projection of said lens and positioned to slide along and make conductive contact with said tongue during movement of said lens from its said second position toward its said fully seated first position.

* * * * *